SEQUENCE CONTROL CIRCUIT

Filed March 7, 1946 2 Sheets-Sheet 1

INVENTOR.
MARTIN J. COHEN
GEORGE P. WACHTELL
BY GEORGE F. PIEPER JR.
M. C. Hayes
ATTORNEY

INVENTOR
MARTIN J. COHEN
GEORGE P. WACHTELL
GEORGE P. PIEPER JR.

BY M. O. Hayes

ATTORNEY

Patented May 4, 1954 2,677,762

UNITED STATES PATENT OFFICE 2,677,762

SEQUENCE CONTROL CIRCUIT

Martin J. Cohen and George P. Wachtell, Princeton, N. J., and George F. Pieper, Jr., Williamstown, Mass., assignors, by mesne assignments, to the United States of America as represented by the Secretary of the Navy Application March 7, 1946, Serial No. 652,517

28 Claims. (Cl. 250—27)

This invention relates to electronic control circuits and particularly to a novel multivibrator operating in connection with blocking oscillators and modulators for furnishing a series of consecutive pulses, each dependent upon the generation of a previous pulse.

Heretofore electronic control circuits have been limited in application because their long recovery time dictated a maximum control rate that was undesirably slow.

An object of this invention is to provide an electronic control pulse modulating circuit whose maximum control rate does not depend upon the recovery time of a single modulator.

Another object of this invention is to provide an electronic control circuit which may be used to provide a single output pulse for three input pulses.

A further object of this invention is to provide an electronic control circuit that will furnish a series of consecutive pulses, each dependent on the generation of the previous pulse.

A still further object of this invention is to provide an electronic control circuit which allows a plurality of blocking oscillators to be fired in consecutive order.

These and other objects will be apparent to one skilled in the art from the following specification when taken with the accompanying drawing in which.

Figure 1:
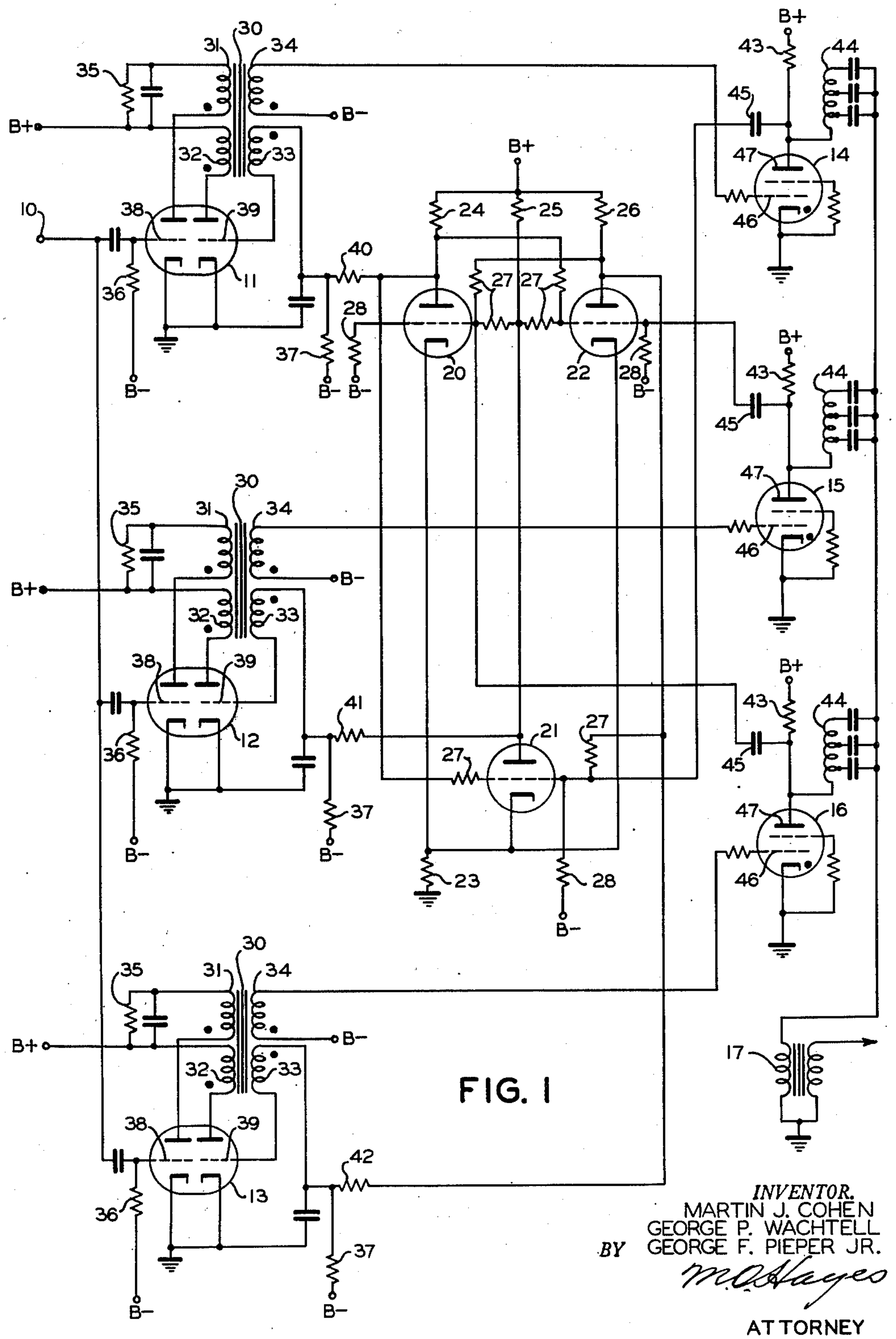
Fig. 1 is a schematic diagram of an embodiment of the invention.

Referring to the drawing and particularly to Fig. 1, the left hand halves of dual triode tubes 11, 12, and 13 and their associated circuit elements form three identical amplifiers, all fed from the common input terminal 10. The right hand valves of dual triode tubes 11, 12, and 13 and their associated circuit elements form three identical biased blocking oscillators, each fed by its respective amplifier. The three oscillators 11, 12, and 13 are connected respectively to three identical modulators 14, 15, and 16. A three tube switch is made up of the tubes 20, 21, and 22 and the associated circuit elements. The plate circuits of switch tubes 20, 21, and 22 are coupled respectively to blocking oscillator circuits 11, 12, and 13; and the grid circuits of switch tubes 20, 21, and 22 each having a driving connection respectively from modulator tubes 16, 14, and 15. These connections permit modulator tubes 14, 15, and 16 to turn off switch tubes 21, 22, and 20 respectively which control the bias on blocking oscillator 12, 13, and 11 respectively. The outputs of modulators 14, 15, and 16 are fed to common output transformer 17.

Referring now to switch tubes 20, 21, and 22, resistor 23 is common to all cathodes and is returned to ground. The plates are returned to B+ through load resistors 24, 25, and 26. Resistors 27, all of substantially equal value, connect the plate of each switch tube to the grids of the other two switch tubes so that two tubes are always on and one tube off. Bias voltage, B—, is connected to the grids of these tubes through similar resistors 28. The conventional blocking oscillators 11, 12, and 13 and conventional modulators 14, 15, and 16 have identical circuit elements and hence corresponding parts are indicated by the same reference numerals.

Referring now to blocking oscillator 11 and modulator 14, the following description of which will suffice for oscillators 12 and 13 and modulators 15 and 16, grid 38 is connected through resistor 36 to a bias voltage (B—) and hence the left hand half of tube 11 is held at plate current cutoff. The anode is returned to B+ through winding 31 of transformer 30. Resistor 35 is not necessary to the operation and transformer winding 31 can be connected directly to B+. Grid 39 connects through winding 33 of transformer 30 to B— through resistor 37 and to a variable direct voltage source, the plate of tube 20, through resistor 40. The anode of this half of tube 11 is returned to B+ through transformer winding 32. Transformer winding 34 applies B— and a driving connection to the control grid 46 of modulator 14 thus holding it nonconductive. Anode 47 returns to B+ through current limiting resistor 43. The modulator output, taken from anode 47, feeds L.-C. pulse forming network 44 thence output transformer 17 as well as through condenser 45 to the grid of switch tube 21.

In operation, video pulses of limited amplitude are introduced at terminal 10 which is connected to grids 38 of oscillators 11, 12, and 13. Switch tubes 20, 21, and 22 determine which oscillator will be triggered by the incoming pulse. Since it is impossible to predict the switch tube which will not conduct when the apparatus is initially turned on, assume that tubes 21 and 22 are conducting and tube 20 is not conducting. While tube 20 is cut-off, the bias on grid 39 of tube 11, determined by voltage division across resistors 37 and 40, is decreased (less negative voltage) so that oscillator 11 will be fired by the first incoming pulse. The firing of blocking oscillator 11 induces a positive pulse of voltage in transformer winding 34 which triggers modulator 14 into conduction. The negative pulse thus produced on the plate 47 by the firing of tube 14 is applied through condenser 45 to the grid of the tube 21 and turns it off. The rise in plate potential of tube 21 accompanying the negative grid pulse turns tube 20 on, increasing the bias (more negative voltage) on grid 39 of tube 11 and decreasing the bias (less negative voltage) on grid 39 of oscillator 12. This allows the next pulse from terminal 10 to fire oscillator 12 which in turn fires modulator 15. The drop in plate voltage of tube 15 turns tube 22 off and tube 21 on. The next input pulse at terminal 10 will then fire oscillator 13 and, in turn, modulator 16. Switch tube 20 will then be turned off, tube 22 turned on, and oscillator 11 biased properly for firing on the next incoming pulse. Obviously this circuit places a limitation on the amplitude of the incoming pulses for, if such were not the case, there would be no limit to the amplitudes of the plate voltages of the oscillator tubes and, since there is a limit to the magnitudes of the biases to which the grids are subjected, all of the oscillators would be rendered operative by a single pulse and the circuit would then be inoperative. As an example of the operation, assume that the maximum repetition rate of each modulator is 2000 cycles per second. Since each modulator 14, 15, and 16 is fired consecutively, the recovery time an individual modulator is circumvented by adding more blocking oscillator, modulator and switch tube groups. If the maximum repetition rate per modulator equals 2000 cycles per second, the maximum repetition rate obtainable with three blocking oscillator, modulator and switch groups is 6000 cycles per second. To achieve, for example, a 12,000 cycle per second maximum repetition rate, is would be a simple matter to add three more groups.

Figure 2:
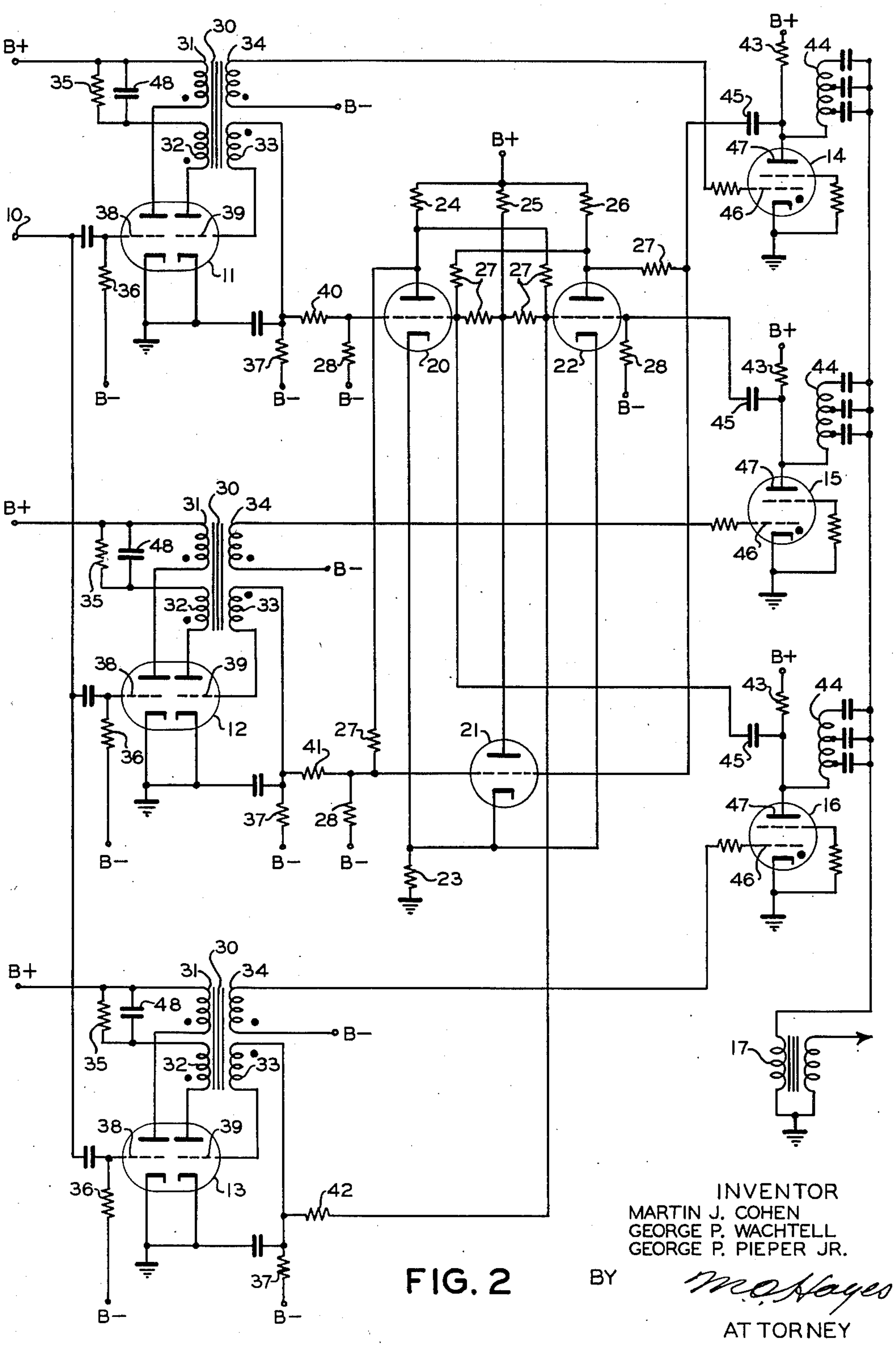
Fig. 2 is a schematic diagram of another embodiment of the invention.

Reference is now made to Fig. 2, in which components corresponding to those in Fig. 1 are correspondingly numbered, for a discussion of the differences between Figs. 1 and 2. Referring to tubes 11 and 20, the following description of which will suffice for tubes 12 and 21, and tubes 13 and 22, B+ is connected through winding 31 to the plate of the left hand half of the tube 11. The plate of the right hand half of tube 11 is connected to B+ through winding 32 and the parallel combination resistor 35 and capacitor 48. Grid 39 of tube 11 connects through winding 33 and resistor 40 to the grid of tube 20.

In operation, when the tube 20 is non-conducting, the grid of tube 20 is at a reduced potential. Resistors 37 and 40 are so chosen that the right-hand half of tube 11 is at cutoff and oscillator 11 is adapted to be rendered operable in response to a video pulse of adequate amplitude introduced at terminal 10. However, when tube 20 is non-conducting, the tubes 21 and 22 are conducting, so that the grids of tubes 12 and 13 are at an increased potential to render the right-hand halves of tubes 11 and 12 normally conducting. The voltages produced across resistors 35, by virtue of the plate current flow therethrough, lower the plate voltages of the right-hand halves of tubes 12 and 13 to a degree to render oscillators 12 and 13 inoperable regardless of the amplitude of the video pulses introduced at terminal 10.

The circuit of Fig. 2 then places no limitation on the amplitude of the incoming video pulses for rotational operation of the three modulators 14, 15, and 16.

Although the modulator outputs are shown connected to one output transformer 17, it is possible to connect each modulator or any combination of modulators to separate outputs. If, for example, a counter of three is desired, suitable connections may be made to any modulator anode circuit.

Also, time delay relays or networks may be connected in any or all of the circuits for changing applications.

Although the drawings and descriptions show what is now believed to be the most desirable arrangement, it will be apparent to one skilled in the art that various changes and modifications may be made therein without departing from the scope of the invention as set forth in the appended claims.

What is claimed is:

1. Apparatus for electronic control comprising, a source of pulses, three blocking oscillator circuits responsive to said pulses, three modulator circuits each connected to one of said oscillator circuits, three electron tube switches, means coupling each electron tube switch to one of said modulators and one of said oscillator circuits, each electron tube switch being controlled by said modulator and controlling said oscillator circuit to which it is connected, and an output circuit connected to said modulators.

2. An electronic control circuit comprising, a three-tube switch, at any instant two tubes of said switch being normally conducting and one normally non-conducting, three blocking oscillator circuits, each blocking oscillator circuit being adapted to be biased to one of two conditions, namely, a condition possible of oscillation and a condition impossible of oscillation, means operatively associated with said two conducting switch tubes and two of said oscillator circuits biasing said two oscillator circuits to said condition impossible of oscillation, means operatively associated with said non-conducting switch tube and said third oscillator circuit for biasing said third blocking oscillator circuit to said condition possible of oscillation and three modulator circuits each connected to a different one of said blocking oscillators.

3. In combination, three blocking oscillator circuits, each having input and output circuits and each adapted to be biased to two conditions, said two conditions being that impossible of oscillation and that possible of oscillation, a source of video pulses coupled to said blocking oscillator input circuits and adapted to render said blocking oscillators operative when said oscillators are in said condition possible of oscillation, a three-tube switch having two normally conducting tubes and one normally non-conducting tube at any instant, means operatively associated with said two conducting switch tubes and two of said oscillators for biasing said two oscillators to said condition impossible of oscillation, means operatively associated with said non-conducting switch tube and said third oscillator for biasing said third oscillator to said condition possible of oscillation, three modulator circuits each having input and output circuits, means coupling each of said modulator input circuits to a different one of asid oscillator output circuits, means coupling each of said modulator output circuits to a different one of said switch tubes, whereby each of said modulator output circuits provides an output pulse signal equal to a multiple of one-third of the frequency of said video pulses, and an output transformer coupled to said modulator output circuits.

4. In combination, a plurality of networks each comprising a coincidence circuit and a switch controlled by said coincidence circuit, the switch of each of said networks being operatively associated with a separate coincidence circuit of the other of said networks.

5. In combination, a plurality of networks, each of said networks comprising a coincidence circuit and a switch controlled by said coincidence circuit, the switch of each of said networks being operatively associated with a separate coincidence circuit of the other of said networks for controlling one input to said separate coincidence circuit.

6. In combination, a plurality of networks, each of said networks comprising a coincidence circuit and a switch coupled to said coincidence circuit and exerting one of two controls on said coincidence circuit, said switch, when exerting said first control, allowing said coincidence circuit to provide an output pulse in response to an input pulse applied thereto, said switch, when exerting said second control rendering said circuit nonresponsive to input pulses applied thereto, said switches in all of said networks being operatively associated with each other so that at any one time only one of said switches is exerting said first control, and the other switches are exerting said second control, means coupling the output of the coincidence circuit of each of said networks to a separate switch of the other of said networks, each switch being responsive to an output pulse from said corresponding coincidence circuit so as to be caused to exert said first control.

7. In combination, a plurality of networks, each of said networks comprising a coincidence circuit and an electron tube switch for producing a control signal of first and second magnitudes, each of said electron tube switches having at least an anode and a control grid, means coupling the anode of each of said electron tube switches to the control grids of the other of said electron tube switches for maintaining all of said electron tube switches conducting save one, each of said electron tube switches being adapted to be rendered non-conductive in response to a pulse applied thereto, thereby rendering the other of said electron tube switches conducting, each of said electron tube switches when non-conducting producing said control signal at said first magnitude, each of said electron tube switches when conducting producing said control signal at said second magnitude, means associated with the electron tube switch and the coincidence circuit of each network for coupling said control signal to said coincident circuit, each of said coincidence circuits being responsive to said control signal at said first magnitude to be rendered responsive to input pulses applied thereto to produce an output pulse for each of said input pulses, each of said coincidence circuits being responsive to said control signal at said second magnitude to be rendered non-responsive to said input pulses applied thereto, and means for coupling the output of the coincidence circuit of each network to a separate electron tube switch of the other of said networks to render said separate electron tube switch non-conductive in response to a pulse coupled thereto from said coincidence circuit.

8. In combination, a plurality of networks each comprising a switch, a blocking oscillator controlled by said switch and a modulator controlled by said blocking oscillator, the modulator of each of said networks being coupled to, and controlling, a switch of a different one of the other networks.

9. In combination, a plurality of networks, each comprising a blocking oscillator, a modulator responsive to the output of said blocking oscillator and a switch coupled to said blocking oscillator and exerting one of two controls on said oscillator, said switch, when exerting said first control, allowing said oscillator to provide an output pulse in response to an input pulse applied thereto, said switch, when exerting said second control, rendering said oscillator inoperative, said switches in all of said networks being operatively associated with each other so that at any one time only one of said switches is exerting said first control and the other switches are exerting said second control, means coupling the output of the modulator of each circuit to a separate switch in the other of said circuits to cause said separate switch to exert said first control in response to a signal appearing at the output of said modulator coupled thereto.

10. In combination, a plurality of networks, each of said networks comprising, a coincidence circuit and a switch tube in one of two states coupled to the output of said coincidence circuit, said switch tube, when in one of said states, being non-conductive and producing a first control signal coupled to said coincidence circuit to allow said coincidence circuit to produce a pulse at its output in response to a pulse appearing at its input, said switch tube, when in the other of said states, being conductive and producing a second control signal coupled to said coincidence circuit to render said coincidence circuit non-responsive to pulses appearing at its input, means coupling the switch tube of each of said networks to the switch tubes of the other networks to cause the assumption of said non-conductive state by only one of said switch tubes at any one time and means coupling the output of the coincidence circuit of each network to a separate switch tube in the other of said networks for rendering said separate switch tube non-conductive in response to a pulse appearing at the output of said coincidence circuit coupled thereto.

11. Apparatus as in claim 10 wherein each of said switch tubes has at least an anode and a control grid, the anode of each switch tube being coupled to the control grids of the other of said switch tubes.

12. In combination, a plurality of networks, each of said networks comprising, a blocking oscillator, a modulator coupled at its input to said blocking oscillator and adapted to produce an output pulse for each pulse appearing at the output of said blocking oscillator, a switch tube in one of two states and having at least an anode and a control grid, said switch tube being coupled at its anode to said blocking oscillator, said switch tube when in one of said states being non-conductive and producing a signal at a first magnitude at its anode, said signal at said first magnitude allowing said blocking oscillator to produce an output pulse in response to a pulse appearing at its input, said switch tube, when in the other of said states, being conductive and producing a signal at a second magnitude at its anode, said signal at said second magnitude rendering said blocking oscillator inoperative, means coupling the anode of the switch tube in each of said networks to the control grids of the switch tubes in the other of said networks to cause the assumption of said con-conductive state at any given time by only one of said switch tubes, and means coupling the output of the modulator of each network to the control grid of a separate switch tube in the other of said networks for causing the assumption of said non-conductive state by said switch tube in response to a pulse appearing at the output of said modulator coupled thereto.

13. Apparatus of claim 12 and an output circuit coupled to the output circuit of each of said modulators.

14. Apparatus of claim 12 and means associated with each of said oscillators adapted to couple a source of pulses to the input of each of said oscillators.

15. In combination, a plurality of networks, each of said networks comprising, a blocking oscillator adapted to be biased by a first signal to one of two conditions, said two conditions being that possible of oscillation and that impossible of oscillation, said oscillator being adapted to produce a pulse at its output in response to a pulse applied at its input when at said condition possible of oscillation, a modulator coupled to said blocking oscillator and adapted to produce an output pulse for each output pulse of said oscillator, and a switch tube having either of two operational states and having at least an anode and a control grid, said first signal appearing at the anode of said switch tube, said switch tube being coupled at its anode to said blocking oscillator for biasing said blocking oscillator, said switch tube, when in one of said operational states, being non-conductive and producing said first signal at a first magnitude for biasing said oscillator to said condition possible of oscillation, said switch tube, when in the other of said operational states, being conductive and producing said first signal at a second magnitude for biasing said oscillator to said condition impossible of oscillation, means coupling the anode of the switch tube in each network to the control grids of the switch tubes in the other networks to cause the assumption of said non-conductive state by only one of said switch tubes at any one instant, means coupling the output of the modulator of each network to the control grid of a separate one of said switch tubes forming a part of the other of said networks to render said last-mentioned switch tube non-conducting in response to a pulse appearing at the output of said modulator coupled thereto.

16. Apparatus as defined in claim 7 wherein each of said input pulses applied to each of said coincidence circuits has an amplitude intermediate two predetermined magnitudes.

17. Apparatus as defined in claim 7 wherein each of said input pulses applied to each of said coincidence circuits has an amplitude greater than a predetermined amplitude.

18. In combination, a plurality of networks, each of said networks compriisng, a blocking oscillator, a modulator coupled at its input to said blocking oscillator and adapted to produce an output pulse for each pulse appearing at the output of said blocking oscillator, and a switch tube in one of two states and having at least an anode and a control grid, said switch tube being coupled at its anode to said blocking oscillator, said switch tube when in one of said states being non-conductive and producing a signal of a first magnitude at its anode to allow said blocking oscillator to produce an output pulse in response to a pulse appearing at its input and having an amplitude within predetermined limits, said switch tube when in the other of said states being conductive and producing a signal of a second magnitude at its anode to render said blocking oscillator non-responsive to said input pulse, means coupling the anode of the switch tube in each of said networks to the control grids of the switch tubes in the other of said networks to cause the assumption of said non-conductive state at any given time by only one of said switch tubes, and means coupling the output of the modulator of each network to the control grid of a separate switch tube in the other of said networks for causing the assumption of said non-conductive state by said switch tube in response to a pulse appearing at the output of said modulator coupled thereto.

19. In combination, a plurality of networks, each of said networks comprising, a blocking oscillator, a modulator coupled at its input to said blocking oscillator and adapted to produce an output pulse for each pulse appearing at the output of said blocking oscillator and a switch tube in one of two states and having at least an anode and a control grid, said switch tube being coupled at its grid to said blocking oscillator, said switch tube when in one of said states being non-conductive and producing a signal of a first magnitude at its grid to allow said blocking oscillator to produce an output pulse in response to a pulse appearing at its input and having an amplitude greater than a predetermined value, said switch tube, when in the other of said states being conductive and producing a signal of a second magnitude at its grid to render said oscillator non-responsive to said input pulse, means coupling the anode of the switch tube in each of said networks to the control grids of the switch tubes in the other of said networks to cause the assumption of said non-conductive state at any given time by only one of said switch tubes, and means coupling the output of the modulator of each network to the control grid of a separate switch tube in the other of said networks for causing the assumption of said non-conductive state by said switch tube in response to a pulse appearing at the output of said modulator coupled thereto.

20. In combination, a plurality of blocking oscillators having input and output circuits, a modulator having a pulse forming network as a part thereof coupled to the output circuit of each oscillator for generating an output pulse in response to the activation of its associated oscillator, a switching tube coupled to each blocking oscillator, said switching tubes being interconnected such that only one tube is in a non-conducting status at any given time, the particular blocking oscillator coupled to said nonconducting tube being conditioned for activation while the other blocking oscillators are prevented from being activated, a source of trigger pulses having a predetermined repetition frequency coupled to the input circuits of said blocking oscillators, said trigger pulses operating only that blocking oscillator circuit that is conditioned for operation whereby the modulator coupled thereto generates an output pulse and means responsive to the operation of said last-mentioned modulator for rendering a different one of said switching tubes nonconducting whereby a different blocking oscillator is conditioned for activation and operated by the next trigger pulse from said source of pulses.

21. In combination, a plurality of blocking oscillators having input and output circuits, a source of trigger pulses having a predetermined pulse repetition frequency coupled to the input circuits of said oscillators, a modulator having a pulse forming network therein coupled to each oscillator and adapted to be operated in response to the activation of its associated oscillator, said modulators having a relatively long recovery time with respect to the period of said trigger pulses, a thermionic tube coupled to each blocking oscillator, said tubes being interconnected such that only one thereof is in a nonconducting condition at any given time to prepare its associated oscillator for activation, said last-mentioned blocking oscillator being activated in response to the occurrence of a trigger pulse in its input signal, and means responsive to the operation of the modulator coupled thereto for rendering a different one of said thermionic tubes non-conducting whereby a different blocking oscillator is prepared for activation and operated by the next trigger pulse from said source of pulses, said last-mentioned blocking oscillator operating the modulator connected thereto whereby a still different one of said thermionic tubes is rendered nonconducting to prepare for activation a still different blocking oscillator.

22. In combination, a plurality of blocking oscillators having input and output circuits, a source of trigger pulses having a predetermined pulse repetition frequency coupled to the input circuits of said oscillators, a line-pulsing modulator coupled to the output circuit of each blocking oscillator for generating an output pulse in response to the activation of its associated oscillator, said line-pulsing modulators having a relatively long recovery time with respect to the period of said source of trigger pulses and having a common output circuit, a like plurality of switching tubes interconnected such that only one of said tubes is in nonconducting state at any given time, each of said switching tubes being coupled to a different blocking oscillator, the particular blocking oscillator coupled to said nonconducting switching tube being conditioned for operation and being activated by the occurrence of a trigger pulse in its input circuit and means responsive to the operation of said particular blocking oscillator and the line-pulsing modulator coupled thereto for rendering a different one of said switching tubes nonconducting to thereby condition for operation a different one of said blocking oscillators, said last-mentioned blocking oscillator when activated by the next trigger pulse operating the line-pulsing modulator coupled thereto whereby a still different one of said switching tubes is rendered nonconducting to thereby condition for operation a still different one of said blocking oscillators.

23. In combination, a plurality of blocking oscillators having input and output circuits, a source of trigger pulses having a predetermined pulse repetition frequency coupled to the input circuits of said blocking oscillators, a line-pulsing modulator coupled to said output circuits for generating output pulses in response to the activation of its associated oscillator, said modulators being connected in a common output circuit, a like plurality of switching tubes interconnected such that only one of said tubes is in a nonconducting state at any given time, each of said switching tubes being coupled to a different blocking oscillator and a different line-pulsing modulator, said nonconducting switching tube conditioning its associated blocking oscillator whereby said oscillator is operated in response to the occurrence of a trigger pulse in its input circuit and whereby the line-pulsing modulator coupled to said oscillator generates an output pulse, and means responsive to the operation of said modulator for rendering a different one of said switching tubes nonconducting to thereby prepare for operation a different one of said blocking oscillators, said last-mentioned blocking oscillator being activated by the next trigger pulse whereby the line-pulsing modulator coupled thereto generates an output pulse and whereby a still different one of said switching tubes is rendered nonconducting to thereby condition for operation a still different one of said blocking oscillator circuits.

24. In combination, a plurality of networks each comprising, an oscillator and a switch controlled by said oscillator, the switch in each of said networks controlling the operation of a separate oscillator of one of the other of said networks.

25. Apparatus for electronic control comprising, a source of pulses, a plurality of blocking oscillators responsive to said pulses, and a plurality of switches each controlled separately by one of said blocking oscillators, each of said switches controlling separately the operation of one of said blocking oscillators.

26. Apparatus for electronic control comprising, a plurality of networks each comprising a double stability switch and a blocking oscillator controlling the operation of said switch, each of said switches controlling the operation of a separate one of said blocking oscillators.

27. Apparatus for electronic control comprising, a source of pulses, a plurality of oscillators responsive to said pulses, a plurality of modulator circuits each energized separately from one of said oscillators, an output circuit for said modulators and a separate switch controlled by each of said modulator circuits, said switches controlling the operation of said oscillators.

28. Apparatus for electronic control comprising, a source of pulses, a plurality of oscillators responsive to said pulses, a plurality of modulators each energized separately from one of said oscillators, and a plurality of double stability switches each controlled separately by one modulator and each controlling separately the operation of one oscillator.

References Cited in the file of this patent

UNITED STATES PATENTS

| Number | Name | Date |
|---|---|---|
| 2,006,346 | Curtis | July 2, 1935 |
| 2,089,430 | Roys et al. | Aug. 10, 1937 |
| 2,146,862 | Shumard | Feb. 14, 1939 |
| 2,272,070 | Reeves | Feb. 3, 1942 |
| 2,440,253 | Doddington | Apr. 27, 1948 |
| 2,478,919 | Hansell | Aug. 16, 1949 |
| 2,478,920 | Hansell | Aug. 16, 1949 |
| 2,493,517 | Appelgarth | Jan. 3, 1950 |